United States Patent
Björkengren et al.

(10) Patent No.: US 6,253,268 B1
(45) Date of Patent: Jun. 26, 2001

(54) METHOD AND SYSTEM FOR MULTIPLEXING A SECOND INTERFACE ON AN I²C INTERFACE

(75) Inventors: Ulf Christian Björkengren; Anders Khullar, both of Bjärred; Johan Georg Michael Uggmark, Lund, all of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/232,291

(22) Filed: Jan. 15, 1999

(51) Int. Cl.⁷ ....................................................... G06F 13/00
(52) U.S. Cl. ........................... 710/105; 710/128; 710/129
(58) Field of Search .................................... 710/105, 129, 710/101, 11, 62, 72; 709/230, 250, 253; 365/63; 370/252, 466; 340/825; 711/100

(56) References Cited

U.S. PATENT DOCUMENTS

| | | |
|---|---|---|
| 4,779,092 | 10/1988 | Takao . |
| 4,972,432 | 11/1990 | Wilson et al. . |
| 5,276,857 * | 1/1994 | Hartung et al. . |
| 5,376,928 | 12/1994 | Testin . |
| 5,386,579 | 1/1995 | Bourekas et al. . |
| 5,568,471 * | 10/1996 | Hershey et al. . |
| 5,621,901 | 4/1997 | Morriss et al. . |
| 5,710,908 | 1/1998 | Man . |
| 5,771,360 * | 6/1998 | Gulick . |
| 5,793,993 | 8/1998 | Broedner et al. . |
| 5,794,014 * | 8/1998 | Shetty et al. . |
| 5,852,406 | 12/1998 | Edde et al. . |
| 5,884,044 * | 3/1999 | Marsanne et al. . |
| 6,026,007 * | 2/2000 | Jigour et al. . |

FOREIGN PATENT DOCUMENTS

| | | |
|---|---|---|
| 0 619 548 A1 | 10/1994 | (EP) . |
| 2 288 954 | 11/1995 | (GB) . |
| WO 98/15105 | 4/1998 | (WO) . |

OTHER PUBLICATIONS

Phillips Semiconductors 1995 update; "The I²C–bus and how to use it (including specifications)"; Apr. 1995.
EPO Standard Search Report, Mailed Jul. 5, 1999.

* cited by examiner

Primary Examiner—Gopal C. Ray
(74) Attorney, Agent, or Firm—Jenkens & Gilchrist, P.C.

(57) ABSTRACT

A method and system for communicating data between an integrated circuit and each of a first device and a second device. Communications between the integrated circuit and the first device use a first interface protocol, while communications between the integrated circuit and the second device use a second interface protocol. Both interface protocols, however, share the same data bus and clock bus. To communicate using the second interface protocol, the first device, which uses the first interface protocol, is first deactivated by sending address data via the shared data bus that does not identify the first device, thereby causing the first device to enter an inactive state until a stop condition is detected on the shared data bus. Then, communications using the second interface protocol can be carried out, provided that a start or stop condition for the first interface protocol is not inadvertently generated on the shared data bus.

34 Claims, 3 Drawing Sheets

METHOD AND SYSTEM FOR MULTIPLEXING A SECOND INTERFACE ON AN I²C INTERFACE

BACKGROUND OF THE INVENTION

1. Technical Field of the Invention

The present invention relates in general to interfaces for communicating data in an integrated circuit environment, and in particular to a method and system for communicating data over shared bus lines using multiple interfaces.

2. Description of Related Art

Communications between integrated circuits and other devices in many applications use the Intelligent Interconnection Communication (I²C), or Inter-IC, serial interface developed by Philips Semiconductors. In the telecommunications industry, for example, mobile telephones frequently use the I²C interface protocol to communicate between the base band controller, which is typically an application specific integrated circuit (ASIC), and the LCD module. Other devices within mobile telephones also use the I²C interface protocol to receive data (including commands) from, and transmit data to, the base band controller.

However, because the I²C interface is subject to certain patent protections, developers of LCD drivers and other drivers must normally obtain a license to be able to manufacture drivers that support the I²C interface protocol. As a result, the supply of off-the-shelf drivers that support I²C is often limited. With the ever shortening development cycles in the mobile telecommunications industry and other industries that use the I²C interface protocol, there is not always time to custom develop a driver that supports I²C.

On the other hand, many of the existing off-the-shelf drivers support a serial point-to-point interface protocol that uses four lines: a data line, a clock line, a line specifying either command data or display data, and a chip select line. One alternative to having to custom develop a driver that supports I²C is to construct the base band controller or other ASIC to support both the I²C interface protocol and the serial point-to-point interface protocol. Additional devices can then be added using either a driver that supports the I²C interface protocol or a driver that supports a serial point-to-point interface protocol, depending on availability, cost, and functional considerations. To support two interfaces, however, four extra I/O pins (for each of the four serial point-to-point interface lines) are needed on the base band controller. This requirement is problematic because I/O pins add expense and require additional space. In addition, while systems that support multiple interface protocols using shared bus lines have been suggested, such systems are complex, inflexible, and difficult to implement.

There is a need, therefore, for a simplified, flexible method and system that allows communications between an integrated circuit and one or more other devices using one of a plurality of available interface protocols via shared bus lines. The system should include a minimal number of I/O pins. Such a method and system would permit, for example, the use of a driver that supports I²C, when available, or a serial point-to-point driver, if an I²C driver is not available or if different capabilities are desired. In addition, such a method and system would permit the integrated circuit to selectively use different interface protocols depending on which protocol is supported by the device with which the integrated circuit is communicating.

SUMMARY OF THE INVENTION

The present invention comprises a method and system for communicating data between an integrated circuit and a plurality of peripheral devices. The integrated circuit communicates with a first one of the peripheral devices using an I²C interface protocol and communicates with a second peripheral device using some other interface protocol. Both interface protocols, however, share the same data bus and clock bus, thereby reducing the number of pins needed on the integrated circuit.

Communications between the integrated circuit and the first peripheral device are achieved in accordance with standard I²C interface protocols. Thus, to communicate with the first peripheral device, the integrated circuit transmits via the shared data bus a unique I²C start condition followed by an address identifying the first peripheral device. The integrated circuit then transmits, and the first device receives, the data intended for the first device using the shared data bus. The first device then replies with an acknowledge bit after each byte received. At the end of the data transmission, a unique stop condition is transmitted. During such communications using the I²C interface protocol, the integrated circuit maintains a high voltage on a chip select bus. This high voltage on the chip select bus serves to inform the second peripheral device that I²C communications are ongoing and prevents the second device from interfering with such communications.

On the other hand, when communications via the I²C interface are not ongoing, communications with the second peripheral device can be initiated. After a stop condition is sent over the shared data bus, the integrated circuit generates another I²C start condition. This time, however, the start condition is followed by an address that is not used by the first peripheral device (or by any other attached I²C device), which causes the first device (and any other attached I²C devices) to enter into an inactive state. Then, by removing the high voltage on the chip select bus, the second device is activated and data communications between the integrated circuit and the second device, via the shared data bus, can be performed, provided that none of the attached devices inadvertently transmit a start or stop condition, which might reactivate the attached I²C devices. Once such data communications are complete, the integrated circuit generates a stop condition on the shared data bus, causing the attached I²C devices to again begin listening for a start condition. Thus, communications using other interface protocols can be interlaced with I²C communications without requiring an additional data bus and clock bus, while simultaneously avoiding conflicts between the two or more interfaces.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
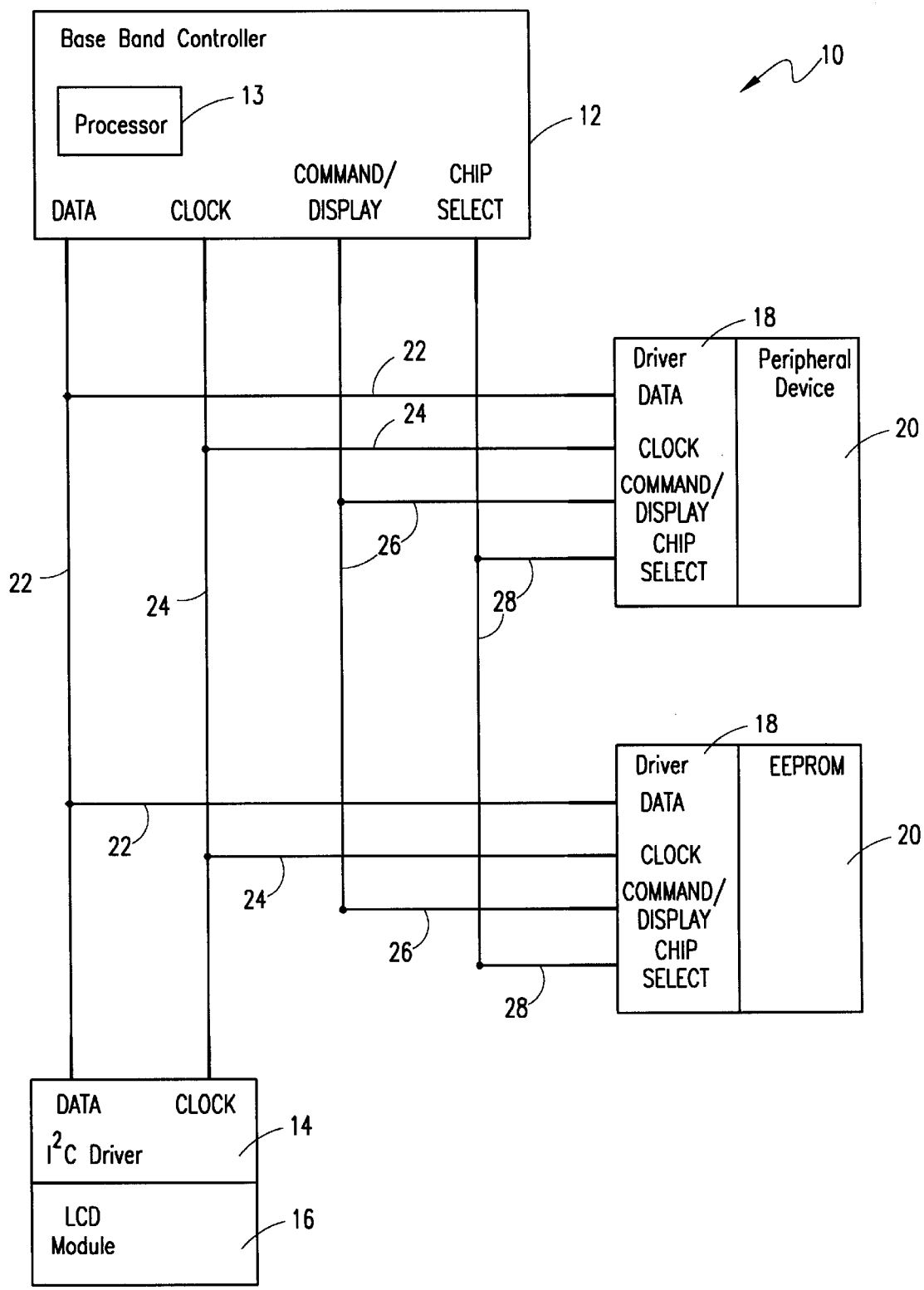
FIG. 1 is an exemplary block diagram of a mobile telephone's internal circuitry.

Reference is now made to the Drawings wherein like reference characters denote like or similar parts throughout the various Figures. Referring now to FIG. 1, there is illustrated an exemplary block diagram of a mobile telephone's internal circuitry 10. Typically, a mobile telephone includes a base band controller 12 (i.e., an application specific integrated circuit (ASIC) that includes a processor 13 for controlling the operation of the mobile telephone), and an LCD driver 14 (an I²C driver, in this case) for communicating command and display data to an LCD display module 16. The mobile telephone can also include other drivers 18 for communicating command data and other data to additional peripheral devices 20, such as an electrically erasable programmable read-only memory (E²PROM).

Communications over an I²C interface are carried out using two bidirectional bus lines: a data bus 22 and a clock bus 24. The I²C interface uses a pull-up resistor concept wherein the voltage level on the bus 22 or 24 is high when the bus 22 or 24 is inactive or free. The same high voltage level is used to designate a logic "1" when the data bus 22 is transmitting data. To designate a logic "0," a transmitting device 12 or 14 connects the data bus 22 to ground, causing the voltage on the entire data bus 22 to go to zero. As a result, any I²C driver 14 can cause the voltage on the data bus 22 to go to zero (i.e., by connecting the data bus 22 to ground). To prevent disruptions that might be caused if two devices 12 and 14 attempt to transmit data at the same time, a conflict resolution process is used. Essentially, by monitoring the voltage level of the data bus 22 during address or data transmission, each transmitting device 12 or 14, when attempting to transmit a logic "1," is able to detect whether another device 12 or 14 causes the voltage on the data bus 22 to go to zero. The conflict is then resolved by awarding priority to the device 12 or 14 that is first to transmit a logic "0" when the other device is transmitting a logic "1." In other words, the device 12 or 14 that is first to detect the presence of transmissions from another transmitting device 12 or 14 surrenders control of the data bus 22 to that other device 12 or 14.

Figure 2:
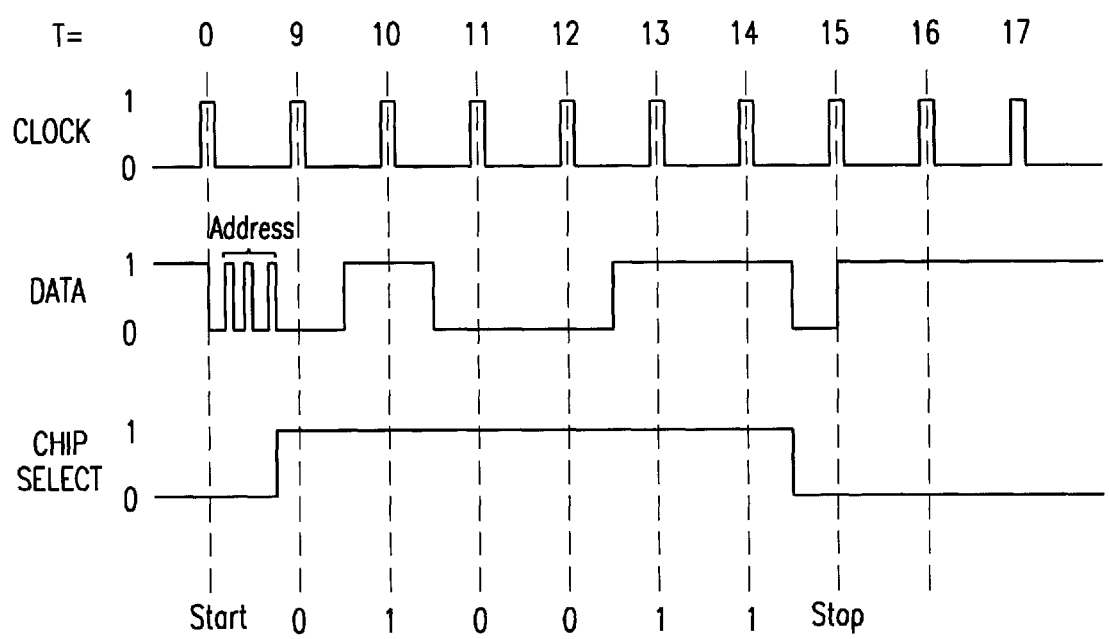
FIG. 2 is a representative diagram of the voltage levels on the clock bus, the data bus, and the chip select bus of the circuitry shown in FIG. 1.

A communication on the I²C interface is initiated by a unique "start condition," wherein the signal on the data bus 22 transitions from high to low while the clock line is in the high state (see FIG. 2). Following the start condition, the transmitting unit 12 or 14 sends the address of the receiving unit 12 or 14. All units not identifying their own address go inactive until a unique "stop condition" (a low to high transition of the data bus 22 while the clock bus 24 is in the high state) is received. Thus, only the unit that is identified by the transmitted address continues to receive data. To ensure that the device is receiving data, the receiving unit 12 or 14 transmits an acknowledge bit, defined by a logic "0" level, after receiving each byte.

In accordance with the present invention, another interface protocol is "interlaced" with the I²C interface using the same data bus 22 and clock bus 24 as the I²C interface. In one embodiment, the "interlaced" protocol is a serial point-to-point interface protocol. Alternatively, a Serial Peripheral Interface (SPI) protocol or some other interface protocol can also be used. Although the following discussion and the Figures focus on the use of a serial point-to-point protocol as an example of the invention, it will be understood by those skilled in the art that other protocols can also be interlaced with the I²C protocol.

After the start condition is generated, the base band controller 12 (or some other device that wishes to communicate via the serial point-to-point protocol) transmits an address that is not used by any of the I²C units 12 or 14 connected to the data bus 22. Following the address transmission an acknowledge bit can also be transmitted by the same device. As a result, all of the connected I²C units go into an inactive state, and the data bus 22 and clock bus 24 can be used for transmitting according to a serial point-to-point interface protocol (or some other interface protocol). The base band controller 12, for example, can send data point-to-point via the data bus 22. In this case, the transmitted data is designated as command data or as display or user data by a signal on the command/display bus 26.

During serial point-to-point data transmissions, any unintentional generation of a start or stop condition must be avoided to prevent the attached I²C units from returning to an active state. Thus, the serial point-to-point units 18 and the base band controller 12 must avoid a high to low transition or a low to high transition on the data bus 22 when the clock bus 24 is in the high state. In addition, serial point-to-point interfaces generally do not maintain a high voltage when not transmitting data. Instead, serial point-to-point interfaces must drive the data line to a high voltage to transmit a logic "1" and drive the data line to a low or negative voltage to transmit logic "0." Because I²C interfaces use the pull-up resistor concept, the drivers 18 that support the serial point-to-point interface protocol must maintain a high impedance during operation under the I²C protocol to prevent such drivers 18 from causing corruption of any transmission that is in progress on the data bus 22. This tristate condition is controlled by an activation signal on the chip select bus 28. Thus, when the system 10 is operating under a serial point-to-point interface protocol, the chip select bus 28 is set high, thereby allowing the serial point-to-point drivers 18 to operate in their normal manner. On the other hand, the chip select bus 28 is set low when the system 10 is using the I²C interface protocol, causing the serial point-to-point drivers 18 to maintain high impedance so as to avoid interfering with the I²C communications. As will be appreciated by those skilled in the art, however, the settings on the chip select bus 28 can be reversed or other signaling methods can be used on the chip select bus 28 to indicate when the overall system 10 is using the I²C interface protocol and when the system 10 is using the serial point-to-point (or some other) interface protocol.

Referring now to FIG. 2, there is shown a representative diagram of the voltage levels on the clock bus 24, the data bus 22, and the chip select bus 28 of the circuitry shown in FIG. 1. At time zero (T=0), the base band controller 12 generates a start condition by causing the voltage on the data bus 22 to go from high to low while the voltage on the clock bus 24 is high. As a result, each of the I²C drivers 14 that are connected to the base band controller 12 begin listening for their unique address. A 7-bit address is transmitted during the next seven clock cycles (i.e., T=1 to T=7 (not explicitly shown)). Alternatively, a 10-bit address might be sent, depending on the type of I²C interface being used. In this example, however, the address transmitted by the base band controller 12 does not identify any of the attached I²C drivers 14. The transmission of an unused address causes the I²C drivers 14 to go into an inactive state, thereby allowing the base band controller 12 (or some other serial point-to-point driver 18) to transmit data using a serial point-to-point interface protocol (or some other interface protocol) while all of the I²C drivers 14 are in an inactive state.

As mentioned above, it is important that the base band controller 12 and any other devices 18 that support the serial point-to-point interface protocol avoid unintentionally generating a start or stop condition throughout the serial point-to-point communication. Furthermore, during the transmission of the start condition and the address data, the serial point-to-point drivers 18 should maintain high impedance to prevent any interference with the I²C communications. Before beginning a serial point-to-point communications, the serial point-to-point drivers 18 must be informed that the data bus 22 is available for serial point-to-point communications. Thus, the base band controller 12 loads the chip select bus 28, activating the receiving serial point-to-point driver 18 to receive data, beginning after the transmission of the first address byte as specified in the I²C standard, at the ninth clock cycle (T=9) in this case. The base band controller 12 then transmits, and the receiving driver 18 receives, a string of binary data (i.e., logic 0 at T=9, logic 1 at T=10, logic 0 at T=11, and so on).

After the data transmission is complete, the chip select bus 28 is turned off, causing the serial point-to-point drivers 18 to return to an inactive/high impedance state. In addition, the base band controller 12 generates a stop condition at a clock cycle after the data transmission is complete (at T=15 in this case). The generation of a stop condition causes the attached I²C units 14 to return to an active state, in which they again begin to listen for a start condition (beginning at T=16).

Figure 3:
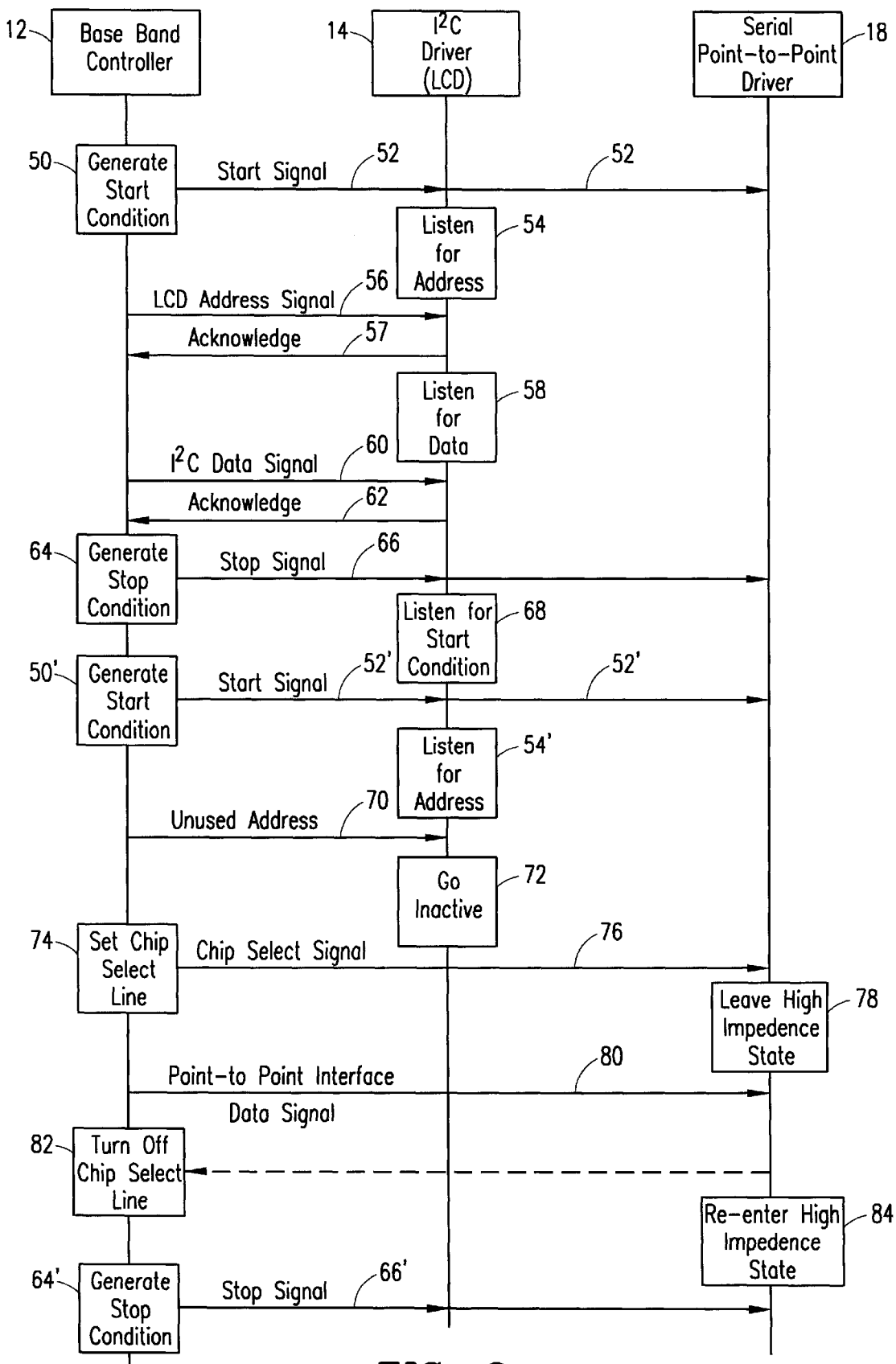
FIG. 3 is a message flow and system operation diagram illustrating a transmission of data via an I²C interface and via a serial point-to-point interface.

Referring now to FIG. 3, there is depicted a message flow and system operation diagram illustrating a transmission of data via an I²C interface and via a serial point-to-point interface. To initiate a data transfer over the I²C interface, the base band controller 12 generates a start condition at step 50, which causes an I²C start signal 52 to be sent out over the data bus 22 to all of the attached drivers 14 and 18. In response to the start signal 52, the attached I²C drivers 14 listen for their respective addresses at step 54. Beginning with the next clock cycle after the start condition, the base band controller 12 transmits an address signal 56 containing the unique address of an LCD driver 14 that supports the I²C interface protocol. As a result, any attached devices 14 that support I²C and that are not identified by the transmitted address go into an inactive state, while the addressed LCD driver 14 transmits an acknowledge bit signal 57 over the data bus 22 to inform the base band controller 12 that it is ready to receive data, and then begins to listen for data at step 58.

The base band controller 12 begins transmitting an I²C data signal 60. In addition, after receiving each byte of the I²C data signal 60, the receiving LCD driver 14 transmits an acknowledge bit signal 62 over the data bus 22 to inform the base band controller 12 that the data was received. Once the I²C data message is complete, the base band controller 12 generates a stop condition at step 64, which causes a stop signal 66 to be transmitted along the data bus 22 to all of the attached devices 14 and 18. Immediately upon receiving the stop signal 66, all of the attached I²C units 14 begin monitoring the data bus 22 for a start condition at step 68.

To initiate another data transfer (this time using a serial point-to-point interface protocol), the base band controller 12 again generates a start condition at step 50', causing the start signal 52' to be forwarded to all of the attached units 14 and 18. Thus, the I²C units 14 again begin to listen for their respective addresses at step 54'. In this case, however, the base band controller 12 transmits an address signal 70 containing an address that is not used by any of the attached I²C units 14. As a result, all of the attached I²C units 14 enter an inactive state at step 72. The base band controller 12 then sets the chip select line at step 74, sending a chip select signal 76 to all of the attached serial point-to-point drivers 18. In response to the chip select signal, at step 78 the serial point-to-point drivers 18 leave the high impedance state, which is used by these drivers 18 during I²C operations, thereby enabling the drivers 18 to receive serial point-to-point data. The base band controller 12 then sends the desired serial point-to-point interface data signal 80 to the receiving unit 18. After the data signal 80 is complete, the base band controller 12 turns off the chip select line at step 82, causing the serial point-to-point drivers 18 to re-enter the inactive/high impedance state at step 84, and generates a stop condition at step 64'. The resulting stop signal 66' causes the I²C units 14 to again begin monitoring the data bus 22 for a start condition (see step 68).

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for communicating data between an integrated circuit and a plurality of other devices, wherein the integrated circuit uses a first interface protocol for communicating with a first device and a second interface protocol for communicating with a s econd device, comprising the steps of:

providing a clock signal via a shared clock bus, said shared clock bus connected to the integrated circuit, the first device, and the second device;

transmitting data intermittently between the integrated circuit and the first device via a shared data bus using the first interface protocol, said shared data bus connected to the integrated circuit, the first device, and the second device, wherein data is transmitted between the integrated circuit and the first device in accordance with the clock signal on the shared clock bus;

deactivating communications that use the first interface protocol;

enabling communications using the second interface protocol while communications that use the first interface protocol are deactivated; and transmitting data between the integrated circuit and the second device via the shared data bus using the second interface protocol, said data transmitted between the integrated circuit and the second device in accordance with the clock signal on the shared clock bus, wherein the step of transmitting data using the second interface protocol is performed without reactivating communications that use the first interface protocol.

2. The method of claim 1 wherein the first interface protocol comprises Intelligent Interconnection Communication (I²C).

3. The method of claim 2 wherein the step of deactivating communications that use the first interface protocol comprises the steps of:

generating a start condition signal on the shared data bus; and transmitting a selected address over the shared data bus, wherein the selected address is not used by any I²C device connected to the shared data bus.

4. The method of claim 3 wherein the step of transmitting data intermittently between the integrated circuit and the first device further comprises the steps of:

generating a start condition signal on the shared data bus;

transmitting an address of the first device over the shared data bus;

sending data via the shared data bus from the integrated circuit to the first device; and generating a stop condition signal on the shared data bus.

5. The method of claim 3 wherein the second interface protocol comprises a serial point-to-point interface protocol.

6. The method of claim 3 wherein the step of enabling communications using the second interface protocol comprises sending a second interface activation signal via a chip select line.

7. The method of claim 3 wherein the second interface protocol comprises a Serial Peripheral Interface (SPI) protocol.

8. The method of claim 3 wherein the integrated circuit comprises a base band controller in a mobile telephone.

9. The method of claim 8 wherein the first device comprises an LCD driver.

10. The method of claim 3 further comprising the step of reactivating communications that use the first interface protocol after completing the transmission of data between the integrated circuit and the second device.

11. A system for communicating data, comprising:
an integrated circuit having at least a data pin and a clock pin, said data pin coupled to a shared data bus and said clock pin coupled to a shared clock bus, wherein the integrated circuit supports a first interface protocol and a second interface protocol;
a first driver supporting the first interface protocol, the first driver coupled to the shared clock bus and coupled to the shared data bus for communicating data between the integrated circuit and a first device via the shared data bus using the first interface protocol, wherein the communication of data is performed using clock signals received via the shared clock bus;
a second driver supporting the second interface protocol, the second driver coupled to the shared clock bus and coupled to the shared data bus for communicating data between the integrated circuit and a second device via the shared data bus using the second interface protocol, wherein the communication of data is performed using clock signals received via the shared clock bus; and
wherein the integrated circuit operates to deactivate the first driver by sending a deactivation signal over the shared data bus, to activate the second driver for performing communications between the integrated circuit and the second device, and to transmit data to the second device using the second interface protocol without generating a reactivation signal to reactivate the first driver.

12. The system of claim 11 wherein the first interface protocol comprises Intelligent Interconnection Communication ($I^2C$).

13. The system of claim 12 wherein the second interface protocol comprises a serial point-to-point interface protocol.

14. The system of claim 12 wherein the second interface protocol comprises a Serial Peripheral Interface (SPI) protocol.

15. The system of claim 12 wherein the first driver comprises an LCD driver.

16. The system of claim 12 wherein the integrated circuit deactivates the first driver by sending an address not associated with the first device.

17. The system of claim 12 wherein the integrated circuit activates the second driver using a chip select line.

18. The system of claim 12 wherein the integrated circuit reactivates the first driver by sending a stop condition over the shared data bus after completing the transmission of data to the second device.

19. A base band controller in a mobile telephone, comprising:
a data pin for alternately and selectively transmitting data, via a shared data bus, to each of a first driver and a second driver, wherein data is transmitted to the first driver using an Intelligent Interconnection Communication ($I^2C$) protocol and data is transmitted to the second driver using a different, serial data interface protocol;
a clock pin for transmitting clock signals to the first driver and the second driver, wherein data is transmitted to the first driver and to the second driver using said clock signals;
a chip select pin for transmitting an activation signal via a chip select line to activate a serial data interface of the second driver; and
a processor for controlling the activation signal, for deactivating an $I^2C$ data interface of the first driver while the serial data interface is activated, and for controlling the transmission of data via the shared data bus.

20. The base band controller of claim 19 wherein the processor deactivates the $I^2C$ data interface of the first driver by transmitting an address that is not associated with the first driver.

21. A method for communicating data between an integrated circuit and a plurality of other devices, wherein the integrated circuit uses a first interface protocol for communicating with a first device and a second interface protocol for communicating with a second device, comprising the steps of:
transmitting data intermittently between the integrated circuit and the first device via a shared data bus using the first interface protocol, said shared data bus connected to the integrated circuit, the first device, and the second device;
deactivating communications that use the first interface protocol by performing the steps of:
generating a start condition signal on the shared data bus; and
transmitting a selected address over the shared data bus, wherein the selected address is not used by any device that uses the first interface protocol and that is connected to the shared data bus;
enabling communications using the second interface protocol while communications that use the first interface protocol are deactivated; and
transmitting data between the integrated circuit and the second device via the shared data bus using the second interface protocol, wherein the step of transmitting data using the second interface protocol is performed without reactivating communications that use the first interface protocol.

22. The method of claim 21 wherein the first interface protocol comprises Intelligent Interconnection Communication ($I^2C$).

23. The method of claim 21 wherein the step of transmitting data intermittently between the integrated circuit and the first device further comprises the steps of:
generating a start condition signal on the shared data bus;
transmitting an address of the first device over the shared data bus;
sending data via the shared data bus from the integrated circuit to the first device; and
generating a stop condition signal on the shared data bus.

24. The method of claim 21 wherein the second interface protocol comprises a serial point-to-point interface protocol.

25. The method of claim 21 wherein the step of enabling communications using the second interface protocol comprises sending a second interface activation signal via a chip select line.

26. The method of claim 21 wherein the second interface protocol comprises a Serial Peripheral Interface (SPI) protocol.

27. The method of claim 21 further comprising the step of reactivating communications that use the first interface protocol after completing the transmission of data between the integrated circuit and the second device.

28. A system for communicating data, comprising:
- an integrated circuit having at least a data pin, said data pin coupled to a shared data bus, wherein the integrated circuit supports a first interface protocol and a second interface protocol;
- a first driver supporting the first interface protocol, the first driver coupled to the shared data bus for communicating data between the integrated circuit and a first device via the shared data bus using the first interface protocol;
- a second driver supporting the second interface protocol, the second driver coupled to the shared data bus for communicating data between the integrated circuit and a second device via the shared data bus using the second interface protocol; and
- wherein the integrated circuit operates to deactivate the first driver by transmitting over the shared data bus an address not associated with the first device, to activate the second driver for performing communications between the integrated circuit and the second device, and to transmit data to the second device using the second interface protocol without generating a reactivation signal to reactivate the first driver.

29. The system of claim 28 wherein the first interface protocol comprises Intelligent Interconnection Communication ($I^2C$).

30. The system of claim 29 wherein the second interface protocol comprises a serial point-to-point interface protocol.

31. The system of claim 29 wherein the second interface protocol comprises a Serial Peripheral Interface (SPI) protocol.

32. The system of claim 29 wherein the first driver comprises an LCD driver.

33. The system of claim 29 wherein the integrated circuit activates the second driver using a chip select line.

34. The system of claim 29 wherein the integrated circuit reactivates the first driver by sending a stop condition over the shared data bus after completing the transmission of data to the second device.

* * * * *